Patented June 14, 1938

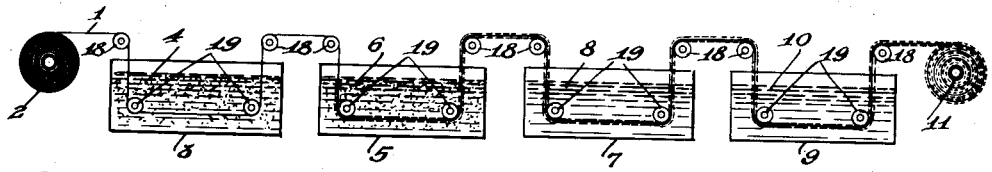
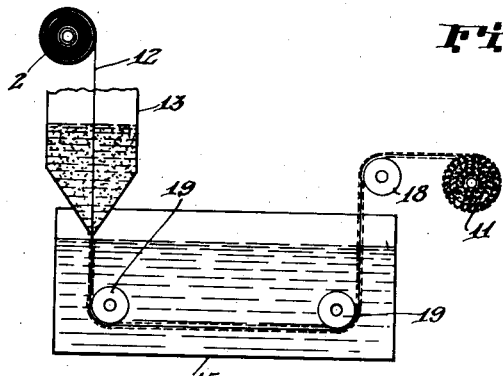
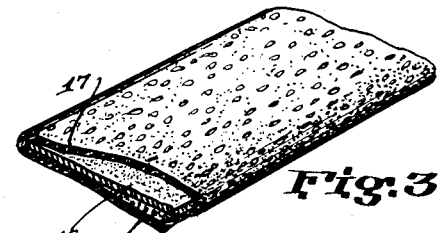
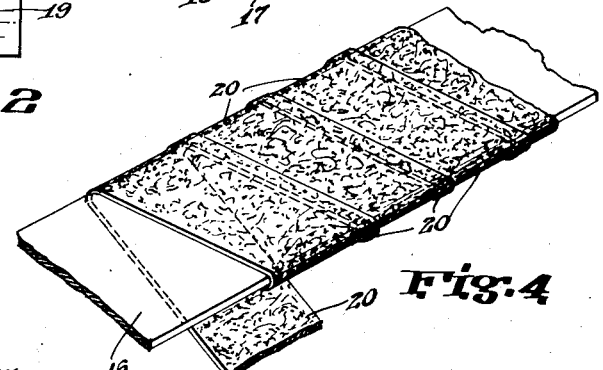
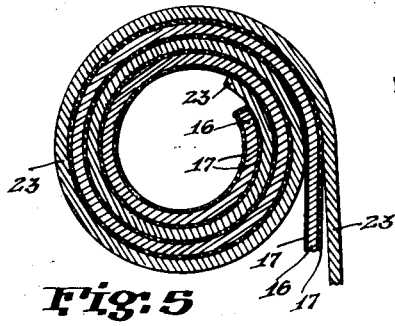
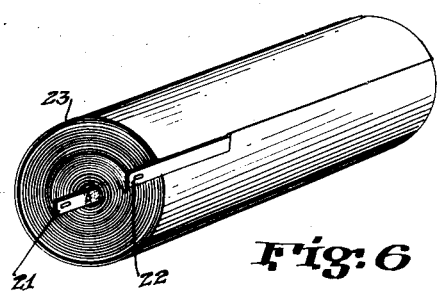

2,120,426

UNITED STATES PATENT OFFICE 2,120,426

ELECTROLYTIC CONDENSER

Werner Herrmann, Finkenkrug, Germany, assignor to Radio Patents Corporation, New York, N. Y.

Application February 7, 1936, Serial No. 62,752
In Germany February 13, 1935

13 Claims. (Cl. 175—315)

The present invention relates to electrolytic condensers, and more particularly to a combined electrode and spacer unit for such condensers, and a method for manufacturing such units.

An object of the invention is to intimately unite the spacer with the electrode.

Another object of the invention is to render the spacer porous while forming and uniting it with the electrode.

Still another object of the invention is to form the spacer and to unite it with the electrode in a single continuous process.

A further object of the invention is the production of a unitary condenser element covered with a film and provided with a spacer which is impregnated with an electrolyte ready for assembly.

These and other objects of the invention will become more apparent as the specification proceeds.

Electrolytic condensers depend for their action on the properties of the dielectric or oxide film which may be formed electrolytically upon the surface of electrodes of film forming material, when immersed in a suitable electrolyte and subjected to the action of an electric current. In the assembled condenser structure, the same or another electrolyte is disposed between the electrodes which may both be covered by a film if the condenser is destined for alternating current, or of which one only may have an oxide film if the condenser is destined for direct current operation. In the condenser the electrolyte serves as means for conducting the electric current to and from the condenser electrodes.

Electrolytic condensers of the aforementioned general character require considerable space for providing a large capacity. In order to reduce this disadvantage, the electrodes of the condenser are to be arranged as close as possible and to be separated by a suitable spacer, such as paper, gauze or the like. The spacer has also the purpose of absorbing the required amount of liquid or semi-liquid electrolyte.

Particularly when using a thick or paste-like electrolyte, a cellulose film as spacing element surpasses paper. Cellulose has the property of swelling by suitable treatment and of absorbing thereby a considerable amount of electrolyte.

It has also been suggested to use micro-porous rubber or rubber sponge as spacing material, containing a large number of extremely fine pores affording absorption of a great amount of electrolyte. Rubber-like materials are subject, however, to impairment by temperature and other influences.

There has also been suggested to employ viscose sponge material in the form of separate strips or plates arranged between the condenser electrodes. The viscose sponge material which differs from sponge rubber in that it contains, or consists of, viscose which is derived from cellulose acetate or an equivalent substance, combines all the desirable properties of a spacer or an electrolyte carrier in electrolytic devices such as condensers. It is highly porous and of great swelling and absorption capacity.

The invention may be more fully disclosed by the following description of examples of methods for carrying it into practice, taken with reference to the accompanying drawing in which Fig. 1 is a diagram more schematically illustrating such a method, Fig. 2 illustrates a modification of the method according to Fig. 1. Fig. 3 shows a cross-section in perspective view of an electrode foil at an enlarged scale, prepared in accordance with the invention. Fig. 4 shows an electrode foil covered with a fibrous material prior to the treatment according to the invention. Fig. 5 shows a form of employing an electrode treated in accordance with the invention in a condenser structure of the wound type; and Fig. 6 shows a perspective view of a condenser embodying an electrode of the type prepared in accordance with the invention.

Similar reference numbers identify similar parts throughout the different views of the drawing.

Referring to Fig. 1, the electrode 1 consists of a strip of film forming material such as aluminum which is drawn from a supply roll 2. It first passes a container 3 containing viscose 4 to which may be admixed a substance adapted to form pores, such as ammonium carbonate. The electrode may be covered with a fibrous material such as a fibrous strip 20 spirally wound around the electrode 16 as shown in Fig. 4 in order to insure, if necessary, a sufficient adherence of the viscose substance to the electrode surface. After leaving the viscose bath, the electrode is passed through a second tank 5 containing a suitable coagulant means 6, preferably consisting of an aqueous solution of an acid or acidic salt, such as diluted sulphuric acid or ammonium sulphate. In passing through this tank, the viscose sponge coating is formed upon the electrode surface, resulting in a highly porous coating adhering to the electrode surface. When using aluminum as electrode material, the aluminum reacts with the alkaline sponge material whereby a gas is produced which in turn acts to promote the formation of pores in the viscose adhering to the electrode, especially at the contact surface between the aluminum and the viscose coating. The surface of the aluminum electrode is also attacked thereby and roughened. Investigations have proven that in any case the viscose sponge thus formed closely adheres to the aluminum surface. In this manner a unitary electrode and spacer strip is produced occupying the smallest space conceivable and simplifying considerably the assembly of the condenser, as will be understood.

After leaving the coagulant 6, the metal strip covered with the coagulated viscose sponge coating is passed through a tank 7 containing a suitable washing medium 8, preferably a diluted weak acid. After leaving the tank 7, the electrode is passed through a further tank 9 containing an electrolyte 10. Therein the viscose sponge coating on the electrode is impregnated with the desired electrolyte solution required in the finished condenser. After passing the impregnating tank 9, the metal strip 1 with the adhering and impregnated viscose coating is wound into a roll 11 which may be used as a stock or supply from which any desired length may be wound off for later use and assembly in a condenser structure. There may be separated also a roll from the remaining strip passing the tanks after it has a desired size suitable for an intended capacity. In order to properly guide the electrode strip in its path through the several treating tanks, suitable guide means are provided such as rollers 18 directing the strip to and from the tanks and rollers 19 for guiding the strips through the separate solutions in the tanks, as shown in the drawing.

The first two baths; that is, the viscose and coagulating baths, may be exchanged in such a manner that the metal strip is first passed through the coagulant and subsequently through the viscose. This is of special advantage when using a metal strip covered with a fibrous material which serves to absorb the coagulating substance.

Referring to Fig. 2, there is shown a modification of a method described by Fig. 1. In the latter, the metal strip 12 is passed through a container 13 containing the viscose material. At the place where the strip 12 leaves the container 13, the latter forms a nozzle which secures a uniform thickness and distribution of the viscose upon the metal strip 12. Then the strip passes into the coagulant contained in the container 15. The remaining steps of the method may be similar as described with reference to Fig. 1.

The impregnating step in the tank 9 of Fig. 1 may be omitted, and the metal strip coated with viscose sponge may be wound immediately onto the stack or supply roll. The impregnation may then be carried out later, either prior or subsequent to the assembly of the condenser in the finished structure. There may be provided also several impregnations, one before and another after rolling the coated strip. There may be further included one or more film forming steps in the continuous process preferably prior to introducing the strip into the viscose or the coagulating bath.

In Fig. 3 is shown in perspective and in somewhat enlarged proportion a part of an electrode treated in accordance with the invention. 16 represents the electrode and 17 the viscose sponge coating applied to and adhering to the electrode surface whereby a unitary electrode and spacer element is formed which may be embodied in the condenser structure of any type known in the art. Thus, the electrode 16 may for instance form the anode, or filmed electrode, in a condenser and is subjected for this purpose to film formation prior to the covering with the viscose sponge coat. The electrode may serve as a cathode or unfilmed electrode in the condenser and for this purpose merely treated in the manner as described by the invention without having a film formed thereon. The film on the electrode may be formed before and/or after application of the viscose sponge coating. Any one of the well known methods of forming and manufacturing condensers may be used in connection with electrodes prepared and treated in accordance with this invention.

As an example, Fig. 5 shows the electrode strip 16 coated with a viscose separator 17 which may, or may not, be impregnated with a suitable electrolyte, wound into a roll together with a metal strip 23. The latter may serve as the cathode in the finished condenser, while the electrode 16 may have a dielectric film formed thereon and serve as an anode.

Fig. 6 shows a finished condenser roll in approximately natural size for about 8 microfarad capacity provided with suitable electrode tabs 21 and 22. The condenser may be mounted in a container of suitable material such as metal or insulating material.

A further advantage of a method of making electrolytic condensers according to this invention consists therein that the aluminum of the electrode reacts with the alkali of the viscose bath, wherefrom a roughening or etching of the electrode surface results which considerably increases the effective surface of a film coated electrode and consequently the capacity of the condenser. It further results in a substantial decrease of the internal ohmic resistance of the condenser particularly if an unfilmed electrode is provided with the viscose coating in accordance with the novel method of the invention. It also increases the cohesion between the coating and the electrode. This roughening or etching of the electrode surface has been indicated on electrode 16 in Fig. 3 of the drawing.

As will be evident from the above, the invention is not limited to the special steps and employment of material shown in the drawing and described in the specification for illustration purposes only, but may be varied and modified within the broader scope and spirit of the invention as defined in the appended claims.

What I claim is:

1. In an electrolytic device, a pair of electrodes, at least one of said electrodes having a layer of viscose sponge adhering thereto, said layer between said electrodes, and an electrolyte absorbed by said layer.

2. In an electrolytic device, a pair of sheet metal electrodes adjacent each other, at least one of said electrodes having a layer of viscose sponge adhering thereto, said layer spacing said electrodes, and an electrolyte absorbed by said layer.

3. In an electrolytic device, a pair of sheet metal electrodes close to each other, one of said electrodes having a closely adhering layer of viscose sponge formed thereon, said layer between said electrodes, and an electrolyte absorbed by said layer.

4. A unitary electrode element for electrolytic devices, comprising a metal base and a layer of viscose sponge adhering thereon.

5. A unitary electrode element for electrolytic devices, comprising a metal base, a layer of viscose sponge adhering thereon, and an electrolyte absorbed by said layer.

6. A unitary electrode element for electrolytic devices, comprising a metal base, a layer of fibrous material applied to said base and a coating of viscose sponge applied and adhering to said base and said layer.

7. An electrode for electrolytic devices, comprising a strip-like metal base, at least one strip of fibrous material spirally wound around said base, and a coating of viscose sponge applied and adhering to said base and said fibrous strip.

8. A unitary electrode element for electrolytic devices, comprising a metal base, a layer of fibrous material applied to said base, a coating of viscose sponge applied and adhering to said base and said fibrous layer, and an electrolyte absorbed by said viscose sponge.

9. A unitary electrode element for electrolytic devices, comprising a metal base, a layer of fibrous material wound around said base, a coating of viscose sponge applied and adhering to said base and said fibrous layer, and an electrolyte absorbed by said viscose sponge and said fibrous layer.

10. In an electrolytic condenser comprising two electrodes, at least one of which is film formed, a contacting conductive medium spacing said electrodes, comprising a layer of viscose sponge adhering to one of said electrodes, and an electrolyte absorbed by said layer.

11. In an electrolytic condenser, two strip-like electrodes wound into a roll, at least one of said electrodes film formed; a contacting conductive medium spacing said electrodes, comprising a layer of viscose sponge adhering to one of said electrodes and an electrolyte absorbed by said layer.

12. In an electrolytic condenser, two electrodes, at least one of which is film formed and has a roughened surface; and a contacting conductive medium spacing said electrodes, comprising a layer of viscose sponge adhering to said film formed electrode and forming a unitary element therewith, and an electrolyte absorbed by said layer.

13. In an electrolytic condenser a pair of spaced electrodes, at least one of which is film formed; a cover of fibrous material for at least one of said electrodes; viscose sponge adhering to said cover and electrode, said cover and viscose sponge spacing said electrodes; and an electrolyte within said spacing means, contacting said electrodes.

WERNER HERRMANN.